(12) United States Patent
Lewis et al.

(10) Patent No.: US 7,554,240 B2
(45) Date of Patent: Jun. 30, 2009

(54) TUBULAR ELECTRICAL MACHINES

(75) Inventors: Clive Lewis, Rugby (GB); Graham LeFlem, Rugby (GB)

(73) Assignee: Converteam Ltd

( * ) Notice: Subject to any disclaimer, the term of this patent is extended or adjusted under 35 U.S.C. 154(b) by 354 days.

(21) Appl. No.: 11/413,035

(22) Filed: Apr. 27, 2006

(65) Prior Publication Data

US 2007/0164615 A1  Jul. 19, 2007

(30) Foreign Application Priority Data

Jan. 18, 2006  (GB) .................................. 0600964.1

(51) Int. Cl.
   *H02K 1/22* (2006.01)
(52) U.S. Cl. .................................................. 310/261
(58) Field of Classification Search ................ 310/261, 310/52, 61, 58, 216
   See application file for complete search history.

(56) References Cited

U.S. PATENT DOCUMENTS

| | | | |
|---|---|---|---|
| 3,898,487 A * | 8/1975 | Sobiepanek et al. | ........... 310/80 |
| 4,303,017 A | 12/1981 | Dull | |
| 5,430,009 A | 7/1995 | Wang | |
| 6,787,944 B2 * | 9/2004 | Finkbeiner et al. | ............ 310/12 |

FOREIGN PATENT DOCUMENTS

| EP | 0 425 314 A1 | 5/1991 |
|---|---|---|
| EP | 0 774 826 A1 | 11/1995 |
| EP | 1 258 973 A2 | 11/2002 |
| GB | 1 415 743 | 11/1975 |
| GB | 30 27 340 A1 | 2/1982 |
| GB | 41 37 992 A1 | 6/1992 |
| GB | 103 35 040 A1 | 3/2005 |
| WO | WO 01/08173 A1 | 2/2001 |
| WO | WO 01/52393 A1 | 7/2001 |

* cited by examiner

*Primary Examiner*—Javaid Nasri
(74) *Attorney, Agent, or Firm*—Kirschstein, et al.

(57) ABSTRACT

An improved synchronous tubular electrical machine comprises a radially outer member that has a substantially cylindrical inner surface and radially inner member that is substantially cylindrical and is coaxially disposed within the outer member such that it may move reciprocally relative to the outer member in the axial direction. A plurality of axially spaced circumferential armature coils are electrically insulated from one another and are formed as part of one of the outer member and the inner member. A plurality of axially spaced circumferential superconducting coils are formed as part of the other of the outer member and the inner member. During operation of the tubular machine, each superconducting coil is maintained in a superconducting state and an electrical current is supplied to each superconducting coil in such a manner that the current flowing around each coil is in the opposite direction to the current flowing around the coils adjacent to it. Such tubular machines may be significantly more efficient, have higher peak-mean power ratios and be much smaller than current permanent magnet based synchronous tubular electrical machines.

33 Claims, 11 Drawing Sheets

TUBULAR ELECTRICAL MACHINES

CROSS REFERENCE TO RELATED APPLICATION

This application claims the priority of United Kingdom Patent Application Serial Number 0600964.1, filed Jan. 18, 2006.

BACKGROUND OF THE INVENTION

1. Field of the Invention

The present invention relates to tubular electrical machines, and in particular to tubular electrical machines that are suitable for use either as direct drive generators or linear motors.

2. Description of the Related Art

It is well known to use linear electrical machines either as generators, to convert an input of linear, usually reciprocating, motion into electrical power, or as motors, to produce a linear movement from an electrical power source. Most linear machines use a flat arrangement, which is based upon the workings of a conventional rotating machine that has been split open to form a flat surface. One of the disadvantages of this arrangement is that the mechanical support of the moving and flat parts can be quite complex. Another disadvantage is that, like rotating machines, flat linear machines usually contain end-windings that do not contribute to the electro-mechanical power conversion process.

Tubular electrical machines are also known and operate in substantially the same manner as these linear machines. They can be considered to be linear machines that have been wrapped up such that the coils in what was previously the flat part of the linear machine become circular and therefore contain no end-windings. The tubular structure has the added benefits that the machines are inherently strong and their mechanical support is a lot less complex than that of conventional linear machines. Permanent magnet-based tubular machines may be formed in one of two ways. The circular coils of the armature winding may be formed in slots provided in a substantially cylindrical outer surface of a radially inner member, which is surrounded by a radially outer tubular member having a substantially cylindrical inner surface that contains rows of permanent magnets. A tubular machine using permanent magnets in this way is described in U.S. Pat. No. 6,787,944. Alternatively, the rows of permanent magnets may be situated on the substantially cylindrical outer surface of the radially inner member and the coils of the armature winding may be formed in slots in the substantially cylindrical inner surface of the radially outer member. In both cases it is usual that, when the tubular machine is in use, the outer member is held stationary and the inner member moves reciprocally relative to it. The opposite case is also possible but is generally less common as it is harder to mechanically support a tubular machine that operates in this manner. Tubular machines may also be of synchronous solid salient pole with wound field coils, induction or reluctance type and these may be formed in substantially the same manner as those tubular machines that use permanent magnets.

There are several problems with the construction and operation of conventional tubular electrical machines. Firstly, the component containing the armature winding (which can be the radially outer member or the radially inner member depending on the particular construction of the tubular machine) is usually formed of a magnetic material such as iron. In large scale tubular machines, like those designed for converting wave energy into electrical energy, the formation of eddy currents in the magnetic component is a major problem that can only be addressed by using expensive and sometimes ineffective amorphous magnetic materials, or expensive manufacturing processes. Designs for permanent magnet tubular machines without magnetic material have been proposed but currently these designs have low power factors and low efficiency.

Another issue is the peak to mean power ratio of existing permanent magnet tubular machines. Because of various electromagnetic limitations in these machines their peak to mean power ratio is typically less than 3:2. This means that the tubular machine has to be electromagnetically designed for almost peak power and there is no significant short-term overload capacity. This is a particular problem in applications such as the generation of electricity from wave power, where the peak to average power is typically very high.

Several designs for superconducting rotating machines have been proposed. The current design of large superconducting rotating machines is dominated by the conventional synchronous machine arrangement with superconducting field windings and conventional or non-superconducting armature windings as disclosed in European Patent Application 1247325. Such superconducting synchronous rotating machines can be made considerably smaller than conventional synchronous rotating machines of the same power rating. This is a result of the very high current density and consequently high flux density that can be achieved by superconducting field windings.

SUMMARY OF THE INVENTION

The present invention provides a tubular electrical machine comprising a radially outer member having a substantially cylindrical inner surface; a radially inner member that is coaxially disposed within the outer member such that it may move reciprocally relative to the outer member in the axial direction; a plurality of axially spaced armature coils that are electrically insulated from one another and are formed as part of one of the outer member and the inner member; and a plurality of axially spaced superconducting coils that are formed as part of the other one of the outer member and the inner member; wherein during operation of the tubular electrical machine, each superconducting coil is maintained in a superconducting state and an electrical current is supplied to each superconducting coil in such a manner that the current flowing around each coil is in the opposite direction to the current flowing around the coil or coils axially adjacent to it.

The high magnetic fields that can be produced by the superconducting coils can be used to overcome some of the problems encountered in conventional tubular machines. Furthermore, because the superconducting coils can produce a high field density, a tubular machine according to this invention can be significantly smaller than a permanent magnet tubular machine of the same power rating.

The high field density produced by the superconducting coils also means that the component containing the armature coils (that is the radially inner member or the radially outer member depending on the particular construction of the tubular machine) may be made without the substantial use of magnetic material. This results in a tubular machine with a low reactance that can consequently provide greatly increased short-term overload capacity. For example, in a tubular machine according to the present invention, where the component containing the armature coils is made substantially without magnetic material, the overload capacity could be as high as six to ten times, or possibly even more, of the rated power of the machine. Large AC tubular machines with a unity power factor can be constructed with such a component that is entirely non-magnetic. This entirely eliminates the problems associated with the development of eddy currents in the magnetic materials of conventional tubular machines. Any suitable non-magnetic material could be used but it is preferable that a low cost material, such as concrete, is used as this greatly reduces the overall cost of the machine. Materials such as concrete can also help maintain the armature coils at a suitable operating temperature by conducting heat away from them.

If physical size is more of an issue than cost then a smaller tubular machine can be achieved by containing the armature coils in a component that has a magnetic portion adjacent to the armature coils. In this case appropriate steps known to the skilled person would have to be taken to control eddy currents. However, a tubular machine constructed in this manner would be significantly smaller than a conventional tubular machine of the same power rating.

In order to increase the mechanical rigidity of the component carrying the armature coils it is preferable that the armature coils are separated from each other in the axial direction by spacers. These spacers are preferably non-magnetic and have low electrical conductivity. For example, the spacers could be substantially formed from a glass fiber reinforced epoxy type material. It would be possible to place rods of high thermal conductivity material in the radial direction within these spacers. However it is to be understood that these spacers are not necessary for the operation of tubular machines according to the present invention and that armature coils that are directly axially adjacent to one another could also be used.

If the armature coils are formed in the outer member, in order to provide improved heat conduction away from the armature coils, it may be preferable to have spacers that are substantially formed from a non-magnetic and low electrical conductivity material but that contain a plurality of radially-extending, circumferentially-spaced rods of high thermal conductivity. The rods may be of substantially the same length as the spacers. Alternatively, in order to provide improved heat conduction, it may be preferable for the rods to extend out of the outer surface of the spacers and into the body of the outer member. In this case the exact length of the rods and the extent of their consequent extension into the body of the outer member will be dependent upon design factors such as the thickness of the outer member and the degree of cooling of the armature coils that is required in each specific machine. The rods may be formed of electrically conductive material, for example mild steel, provided that they have a suitably shaped and small cross-section and they are electrically isolated from one another. As the rods are aligned in the radial direction this ensures that the development of significant eddy currents within the rods is not possible. For example, if the rods are formed of steel they may have a circular cross-section with a diameter between 0.5 mm and 5 mm. Alternatively, they could be of rectangular cross-section with the length of each cross-sectional edge being between 0.5 mm and 5 mm. However, it is to be understood that these are only examples and electrically conductive rods may be of any cross-sectional shape that is suitably sized such that the development of significant eddy currents within each rod is not possible.

Each superconducting coil is preferably formed from at least one turn of superconducting material. The superconducting material may be a low temperature superconducting (LTS) wire or, more preferably, a high temperature superconducting (HTS) wire, cable or tape. LTS wires include $Nb_3Sn$ and NbTi wires, which usually have an operating temperature of about 4.2K.

HTS materials include superconducting cables and tapes produced from wires and tapes made of $(Bi,Pb)_2Sr_2Ca_2Cu_3O_{10}$ filaments in a metal matrix. This material has a superconducting temperature (Tc) of 110K. Like other HTS materials, it has a lattice structure consisting of planes of copper-oxygen ions sandwiched between blocks of insulating ions. Hence, the supercurrent is restricted to two-dimensional flow, meaning that the electrical and magnetic properties of HTS materials can depend on their orientation with respect to magnetic or electric fields. One manufacturer from which the above-mentioned BSCCO-2223 HTS material is available is American Superconductor (AMSC), HTS Wire Manufacturing Facility of Jackson Technology Park, 64 Jackson Road, Devens, Mass. 01434-4020, United States of America. It will be readily appreciated that these superconducting materials are given as an example only. Second generation coated superconducting wires that have substantially improved performance are continually being developed and, depending on cost, the use of these wires may be preferred. Examples of second generation superconducting materials include YBCO ($YBA_2Cu_3O_{7-\delta}$) being developed by American Superconductor (AMSC) and HoBCO ($HoBa_2Cu_3O_{7-x}$), which is currently being developed by the HTS R&D Department of Sumitomo Electric, 1-1-3 Shimaya, Konohana-ku, Osaka 554-0024, Japan.

Depending on the physical size and desired power of the tubular machine, each individual superconducting coil may be made from a plurality of sub-coils, each sub-coil being made from a plurality of turns of superconducting material and each turn having current flowing in the same direction. There may also be support structures between the coils and internal to each coil. If the coils are HTS coils it may be preferable that each coil consists of a number of individual pancake form superconducting sub-coils that are stacked and connected together with support structures formed between the sub-coils. A method of internal support for racetrack shaped coils that could be applied to this application is disclosed in European Patent Application No. 1212760.

There must be at least two superconducting coils but the total number of superconducting coils used in the tubular machine is determined by design factors such as the desired power rating, size and cost of the machine. In use, each superconducting coil is supplied with an electric current that flows in the opposite direction to the current supplied to the superconducting coil or coils that are axially adjacent to, but spaced apart from, the coil. This has the effect of forcing the magnetic flux in the axial spaces between the opposing currents in the radial direction, thereby creating alternate north and south poles between the superconducting coils in those spaces. If there are more than two superconducting coils it is preferable that the end coils have a different total current (Amp-turns) flowing around them in order to maintain a consistent field density along the entire axial length containing the superconducting coils. This can be done by supplying a different current to those end coils or by altering the number of turns that make up each of those end coils. Furthermore, in order to ensure the correct supply of current to each superconducting coil, it is preferable that all of the coils are electrically connected together to form a single superconducting winding.

In order to provide a low reluctance flux path for the magnetic field generated by the superconducting coils, the component containing the superconducting coils (which can be the radially outer member or the radially inner member depending on the particular construction of the tubular machine) is preferably substantially formed of a magnetic material. If the superconducting coils are contained in the outer member of the tubular machine then the outer member might contain at least an annulus of magnetic material. For example, if the outer member is a tube having substantially cylindrical inner and outer surfaces then the entire outer member can be manufactured of magnetic material. Alternatively, if the superconducting coils are contained in the inner member then the inner member will preferably contain at least a support of magnetic material. The magnetic material used will depend upon the operating temperature and stresses of the component containing the superconducting coils. Since the flux in this component is DC when the tubular machine is operating, the magnetic material can be in a substantially magnetically saturated state without causing any additional losses. Furthermore if it is desired to reduce the amount of superconducting wire the amount of saturation can be reduced by providing a greater amount of magnetic material. The outer surface of the axial length of the component containing the superconducting coils is also preferably enclosed by a sleeve of high conductivity metal such as copper or aluminum, for example. Such a sleeve will form a low resistance path for eddy currents and will thereby shield the superconducting coils from AC magnetic flux that is caused by harmonics in the armature coils and by load changes.

The superconducting coils are preferably maintained at their operating temperature by a cryocooling system. This is a cooling system that maintains specific parts of the tubular machine at the specific cryogenic operating temperature required by the superconducting coils. The cryocooling system can be a closed loop system and the superconducting coils are enclosed in a cryostat within that system. The construction of the system and the coolant used will depend on the specific design of each tubular machine, whether HTS or LTS coils are used and what their optimum operating temperature is.

In tubular machines where the cryocooling system is required to reciprocate along with the component containing the superconducting coils then Gifford McMahon or Stirling cycle cryocoolers may be used if the forces caused by the reciprocating movement are reasonably tolerable. For example, if the tubular machine is a generator for converting wave power then the peak velocity of the moving member would be about 2-3 ms$^1$ over a stroke of several meters. Such forces could be easily withstood by these cryocoolers. However, if the cryocooling system is subject to substantial forces caused by the reciprocating movement then a pulse tube cooler could be used for additional support. The cryocoolers mentioned above are given only as examples and many other cryocooling systems would be known to the skilled reader.

If the superconducting coils are formed from an HTS material then the coolant used in the cryocooling system will depend upon the optimum operating temperature of the coils. If the operating temperature of the superconducting coils is in the 30-40K range then gaseous helium could be used as this is suitable for temperatures from 5 to 77K. Alternatively, a phase change system utilising neon could be used for superconducting coils with an operating temperature close to the boiling point of neon at 27K. For higher temperature superconducting coils, i.e., those with operating temperatures of 65-77K, it may be more appropriate to use liquid nitrogen as the coolant. If the superconducting coils are formed from an LTS material then it would be necessary to use liquid helium at 4.2K and in this case a specific liquid helium cryocooling system would be needed. These coolants are given as an example only and it will be readily appreciated that the skilled reader would be able to apply his own knowledge of cryocooling systems to the present invention.

The cryocooling system may also be used to cool at least part of the component containing the superconducting coils. This is preferable if the superconducting coils are formed from an HTS material and the portion of the component containing those coils is formed of a magnetic material which has suitable mechanical properties at the operating temperatures of the HTS material. An example of a suitable magnetic material for the component containing the superconducting coils is 9% Ni, iron, which has excellent mechanical and magnetic properties at cryogenic temperatures as described in "Magnetic Properties of 9% Nickel Steel at Room and Cryogenic Temperatures" by H. Brechna, SLAC Technical Note TN-65-87, Stanford Linear Accelerator Center, Stanford University, Stanford, Calif., (1965). Nickel-iron alloys with higher proportions of nickel would also be suitable but as nickel is an expensive alloying element it is generally preferred if the nickel content can be minimized.

The cooling of at least part of the component containing the superconducting coils enables the superconducting coils to be close to a magnetic material, which will reduce the reluctance flux path of the magnetic field generated by the superconducting coils. If the superconducting coils are mounted on the inner member of the tubular machine then this construction may be achieved by substantially forming the axial length of the inner member that contains the superconducting coils from 9% Ni, iron and maintaining the temperature of the inner member at cryogenic temperatures by enclosing the entire inner member, including the superconducting coils, in a cryostat. The advantage of using a cooled magnetic material is to reduce the amount of HTS material needed to achieve the required flux density in the armature coils.

Alternatively, the cryocooling system can be used to maintain just the superconducting coils at their operating temperature and in this case the coils can be thermally isolated from the component of the tubular machine by a cryostat or other thermal barrier. This is preferred if the component containing the superconducting coils is made of a material that has inadequate material properties at the operating temperature of the superconducting coils. This means that lower cost magnetic materials that do not have suitable properties at cryogenic temperatures can be used. An example of such a material is mild steel.

Magnetic materials with suitable properties at cryogenic temperatures are currently very expensive. The choice of whether to use a component that is in direct contact with the superconducting coils and is maintained at cryogenic temperatures or a thermally isolated warm component is therefore primarily a matter of cost. Current HTS materials are expensive and it is therefore cost-effective to minimize the length of HTS material needed to form the superconducting coils by utilizing a cold component. However, it is envisaged that in the future the cost of suitable HTS materials will fall and it may then be cheaper to construct tubular machines according to the present invention with a mild steel component that is thermally isolated from the superconducting coils.

Each armature coil is preferably formed from stranded conducting wire and consists of a series of circular coils of one or more turns of the conducting wire and is arranged concentrically with the superconducting coils. In order to avoid eddy current losses within the armature coils it is preferable that each coil is formed of turns of fully transposed stranded conductors, such as litz wire, which may be made substantially of copper, for example.

The individual armature coils are preferably interconnected so as to form one or more armature windings. For example, the coils may be connected to form one or more three-phase AC windings. However many other connections are also possible and it is understood that these would be immediately apparent to the skilled person.

The tubular machine according to the present invention contains separate superconducting (or field) and armature windings and under steady state conditions the mechanical movement can be such that the magnetic fields generated in each winding are synchronized. In other words, the tubular machine is preferably a synchronous tubular machine. It will be readily appreciated that tubular machines according to the present invention can operate as alternating current (AC) or direct current (DC) machines depending on their construction and intended use.

The outer surface of the outer member of the tubular machine is preferably substantially cylindrical. This provides the tubular machine with inherent mechanical strength and rigidity arising from its overall tubular shape so that it can better withstand the forces that act on the machine when it is operating. Such a construction may also facilitate the cooling of the armature coils if they are contained within the outer member.

It is usually preferred that the outer member is held stationary and the inner member undergoes reciprocal movement relative to it. This is because it is normally much simpler to provide mechanical support to tubular machines that operate in this manner. Of course, it is also possible for the inner member to be held stationary and for the outer member to undergo reciprocal movement relative to it.

If the tubular machine is operated with the outer member held stationary then it is preferable that the armature coils are formed as part of the outer member and the superconducting coils are formed as part of the inner member. With this particular construction, the main power circuit connection to the armature coils is not required to move and the cooling of the armature coils is much easier. However, any cryocooling system and exciter for the superconducting coils would be required to move together with the inner member. The cryocooling system and the exciter would preferably be supplied with power from a remote power source linked to the inner member by a flexible cable. The magnetic field generated by the superconducting coils would also reciprocate relative to the outer member and the surroundings of the tubular machine. Therefore, if the outer member of the tubular machine is substantially non-magnetic then stray flux may escape the machine. This is inherently undesirable as the escaping stray flux would be moving relative to surrounding structures. One solution to the problem of stray flux is to provide the outer member with an electromagnetic shield. Such a shield would not need to be continuous around the circumference of the outer member as the principal directions of any stray flux would be in the axial and radial directions of the tubular machine. In fact there are technical advantages in not making the shield continuous in the circumferential direction as this would facilitate the flow of eddy currents and introduce eddy current losses. One preferred arrangement of the shield is to mount a plurality of plates of magnetic material around the outer surface of the outer member such that each plate is co-planar with the axis of the outer member. The plates can be regularly spaced around the outer surface and are preferably spaced apart from each other. The plates can extend radially into the outer member. The plates can be made from any suitable magnetic material but are preferably formed from steel.

For additional benefit, the plates forming the electromagnetic shield may protrude out from the outer surface of the outer member (or optionally out of a non-magnetic region of the outer member) to act as cooling fins for the armature coils. The thickness of the plates used in the electromagnetic shield and the number of plates disposed around the outer member must be such that the plates are not magnetically saturated when the tubular machine is operating. On the other hand, the plates must be thin enough to have acceptable eddy current losses. A range of plate thicknesses can therefore be used depending on the precise design of the tubular machine.

An alternative preferred shield arrangement, which may be easier to construct but would not provide any cooling to the machine, would be to form a plurality of axial metal reinforcing rods in the outer member. The number, diameter, shape and positioning of the rods would preferably be optimized as part of the electromagnetic design process for each specific machine. It is to be understood that other shield constructions will also be readily apparent to the skilled person. It is envisaged that by adding a suitable electromagnetic shield to a tubular machine that would otherwise suffer from stray flux losses, the power output may be increased by about 10%.

If the superconducting coils are formed in the outer member and the armature coils are formed in the inner member then, if the outer member is held stationary, the problem of stray flux escaping the tubular machine can be eliminated because the superconducting coils are held stationary relative to the surroundings of the tubular machine at all times. The cryocooling system and exciter for the superconducting coils would also remain stationary and their construction would thus be much simpler. However, the main disadvantages of a tubular machine constructed in this manner are that the main power connection for the armature coils would have to move with the inner member and dissipating heat from the armature coils would be much more difficult.

The relative lengths of the outer member and the inner member are another important consideration in the construction of a tubular machine according to the present invention. This consideration is determined by the need for support of both the outer member and the inner members, the amount of superconducting wire needed in the machine, the power of the machine and the stroke length. Currently the superconducting coils and their associated cryocooling system are the most expensive part of the tubular machine and it is thus preferable that the number of superconducting coils is minimized. This may be achieved by minimizing the axial length containing the superconducting coils or by increasing the spacing of the superconducting coils. However, it is appreciated that the cost of superconducting materials may fall in the future and it may then become preferable to have more superconducting coils. In a preferred aspect of the present invention, the axial length of the inner member can be about twice the axial length of the outer member.

It is important that the inner and outer members are supported relative to one another such that one of them is free to move in the axial direction relative to the other with a minimum of mechanical friction and a bearing structure is preferably provided. For example, if one of the members is held stationary and is substantially longer than the other member then sliding or rolling bearings may be formed on one of the inner surface of the outer member or the outer surface on the inner member and a cooperating bearing track may be formed on the facing surface. However, it will be readily appreciated that bearings between the inner and outer members can be formed in a vast variety of other ways that would be immediately apparent to the skilled person who is familiar with the sort of bearings employed in conventional synchronous tubular machines.

Tubular machines according to the present invention may be used for a variety of purposes. However, as thermal isolation of the cold components is necessary, they are best suited to large scale uses where the diameter of the superconducting coils is typically 200 mm or greater. An example of a particularly preferred use is a generator for producing electricity from wave power in off-shore locations. Large scale reciprocating motors are equally possible.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
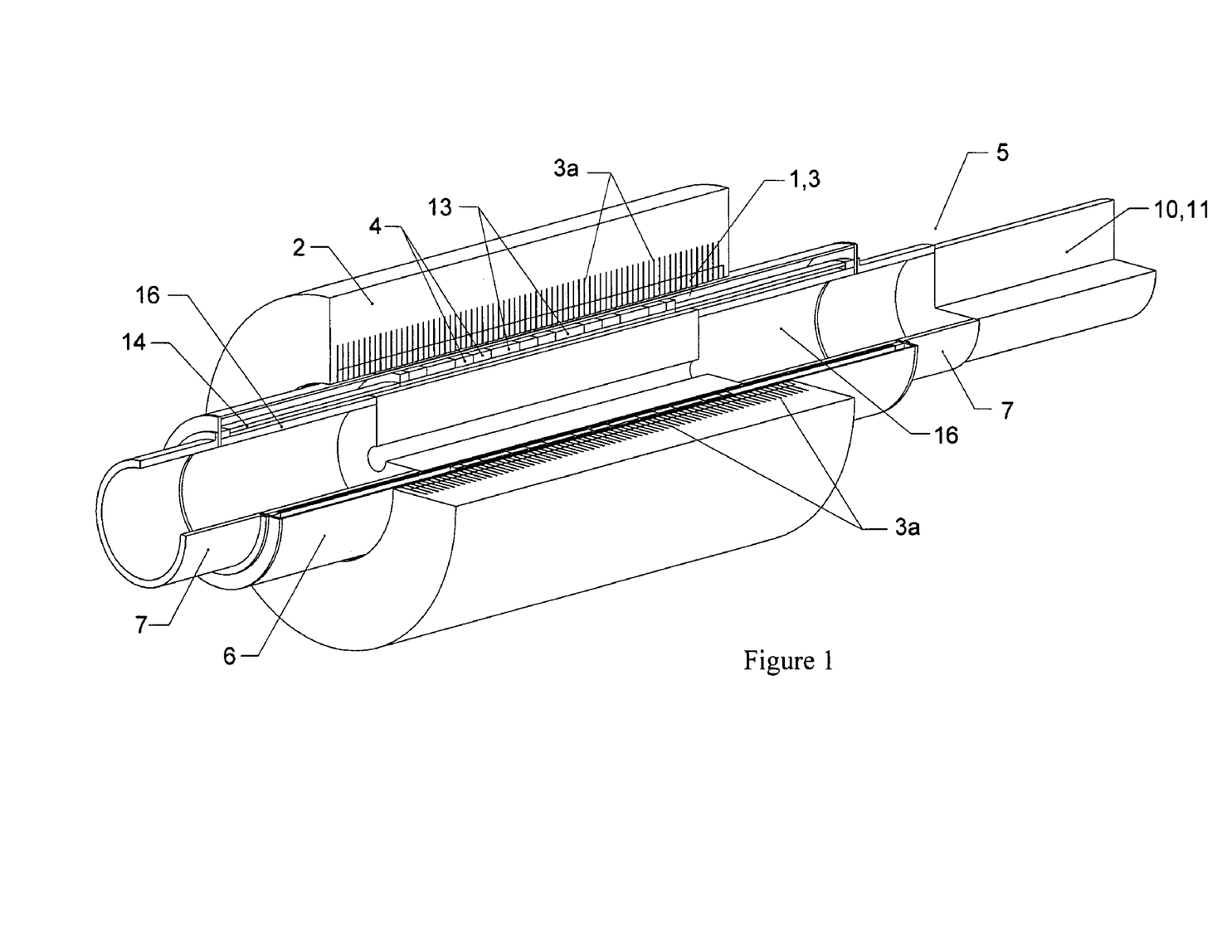
FIG. 1 is a cutaway view of a first embodiment of a tubular machine according to the present invention.
Figure 2:
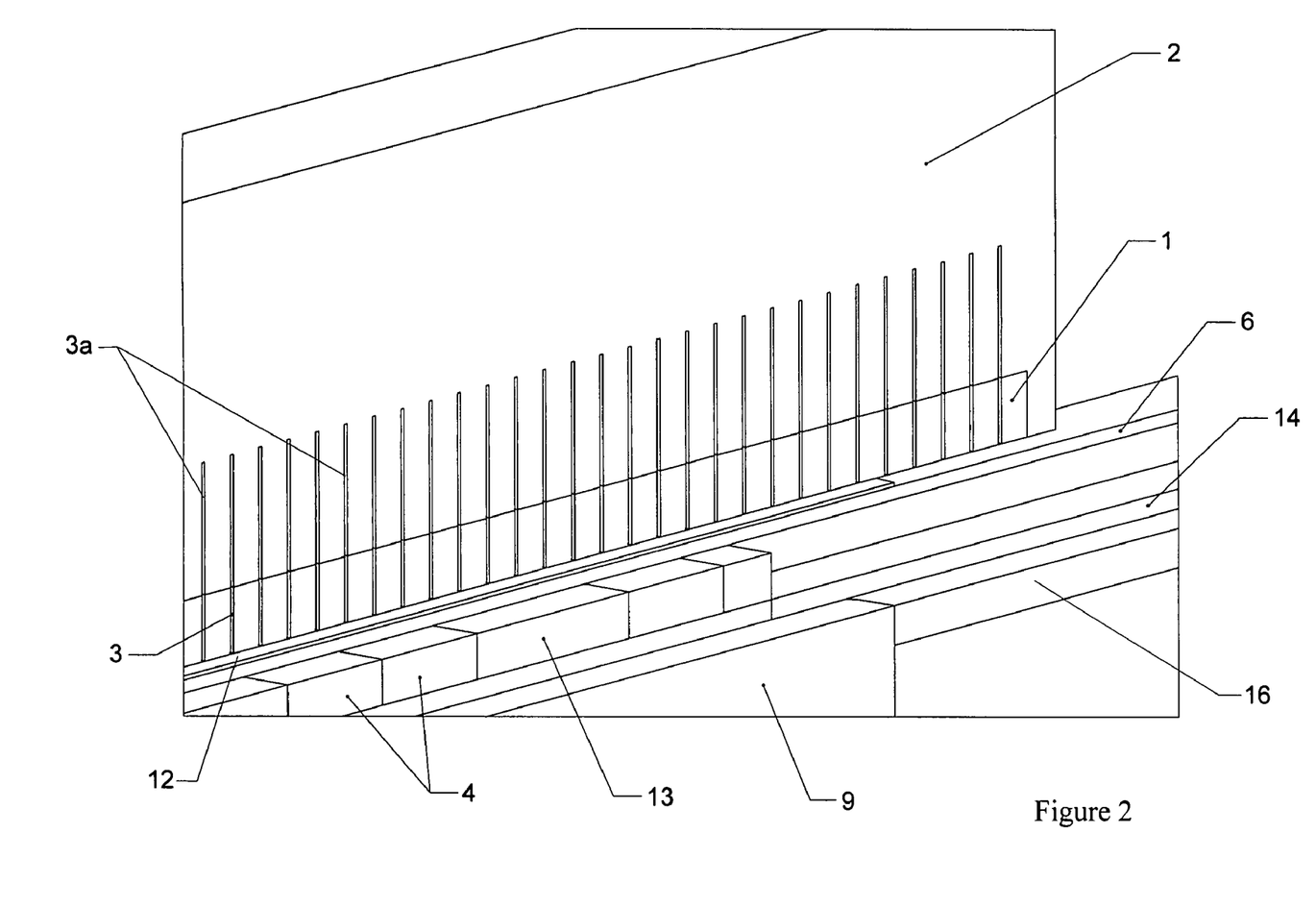
FIG. 2 is a close up view of the tubular machine of FIG. 1.
Figure 3:
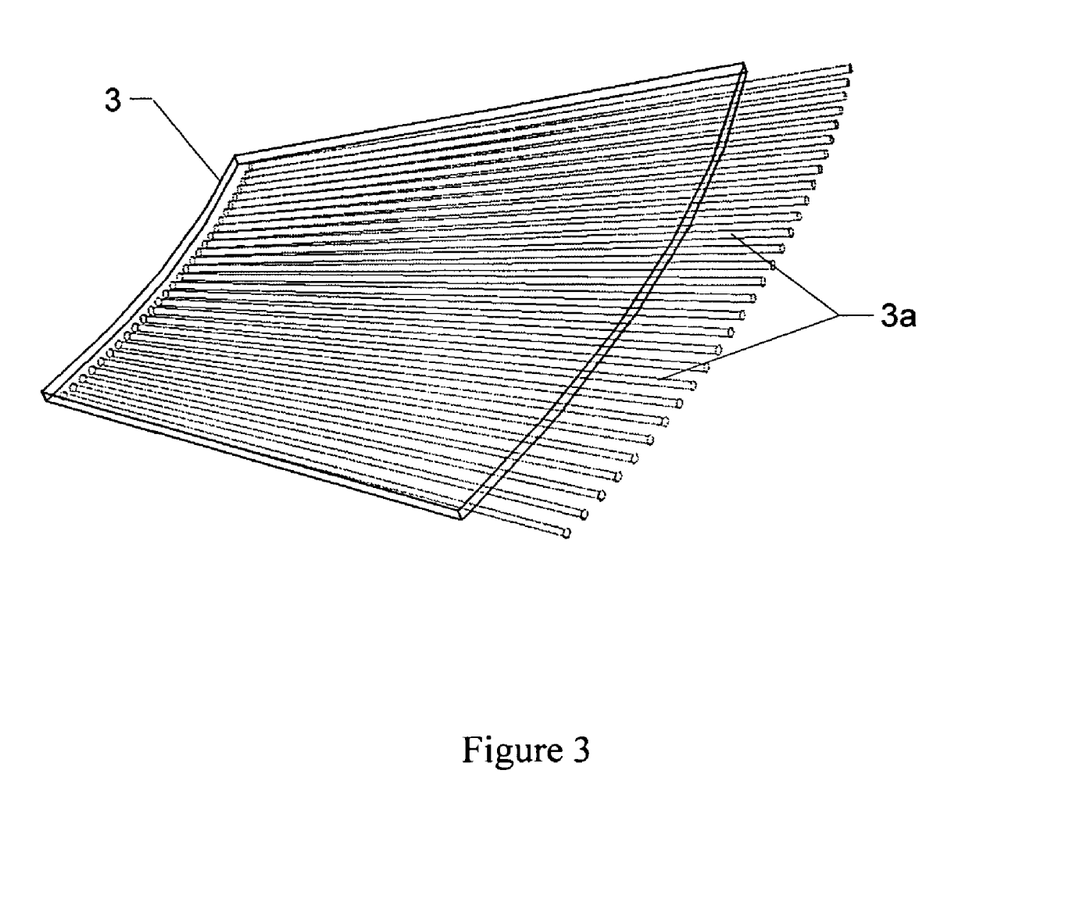
FIG. 3 shows a close up view of a partial circumferential section of a spacer of the tubular machine of FIG. 1.

A first embodiment of a tubular machine according to the present invention will now be explained with reference to FIGS. 1 to 6. In this first embodiment a series of axially spaced armature coils 1 are contained in a tube-shaped radially outer member 2. The armature coils 1 are made of non-superconducting wire and are supported on a non-magnetic non-conducting structure. Since there are no magnetic teeth to guide the flux around the armature coils 1 they need to be stranded and transposed to avoid eddy current losses, which could be achieved by using litz wire, for example. A typical diameter for the armature coils 1 would be 700 mm. As a result of the high current density in the superconducting coils 4 there is no need for a magnetic core to be associated with the armature coils 1. The individual armature coils 1 are connected together to form a three-phase AC armature winding that is attached to a main power circuit connection (not shown). They are separated from each other in the axial direction by thin spacers 3 that are each substantially formed of glass fiber-reinforced epoxy and contain a plurality of radially-extending, circumferentially-spaced steel rods 3a, as shown in FIG. 3. The rods 3a project out of the spacers 3 and into the body of the outer member 2 and thereby provide improved heat transfer from the armature coils 1 to outer member 2. The rods 3a are electrically insulated from one another and are of small diameter so that significant eddy currents can not develop within them.

The outer member 2 surrounding the armature coils 1 is made substantially of concrete and in a typical example may have an outer diameter of about 800 mm. The outer member 2 is preferably formed as a simple one-piece casting but it can also be formed from a series of axially stacked concrete laminations or cast in a number of axial sections. The concrete allows the armature coils 1 to be cooled by conduction through the concrete, optionally to a water jacket (not shown) on the outside surface. A tubular machine of this type might operate at an average power of 150 kW and a peak power of 1000 kW.

Figure 4:
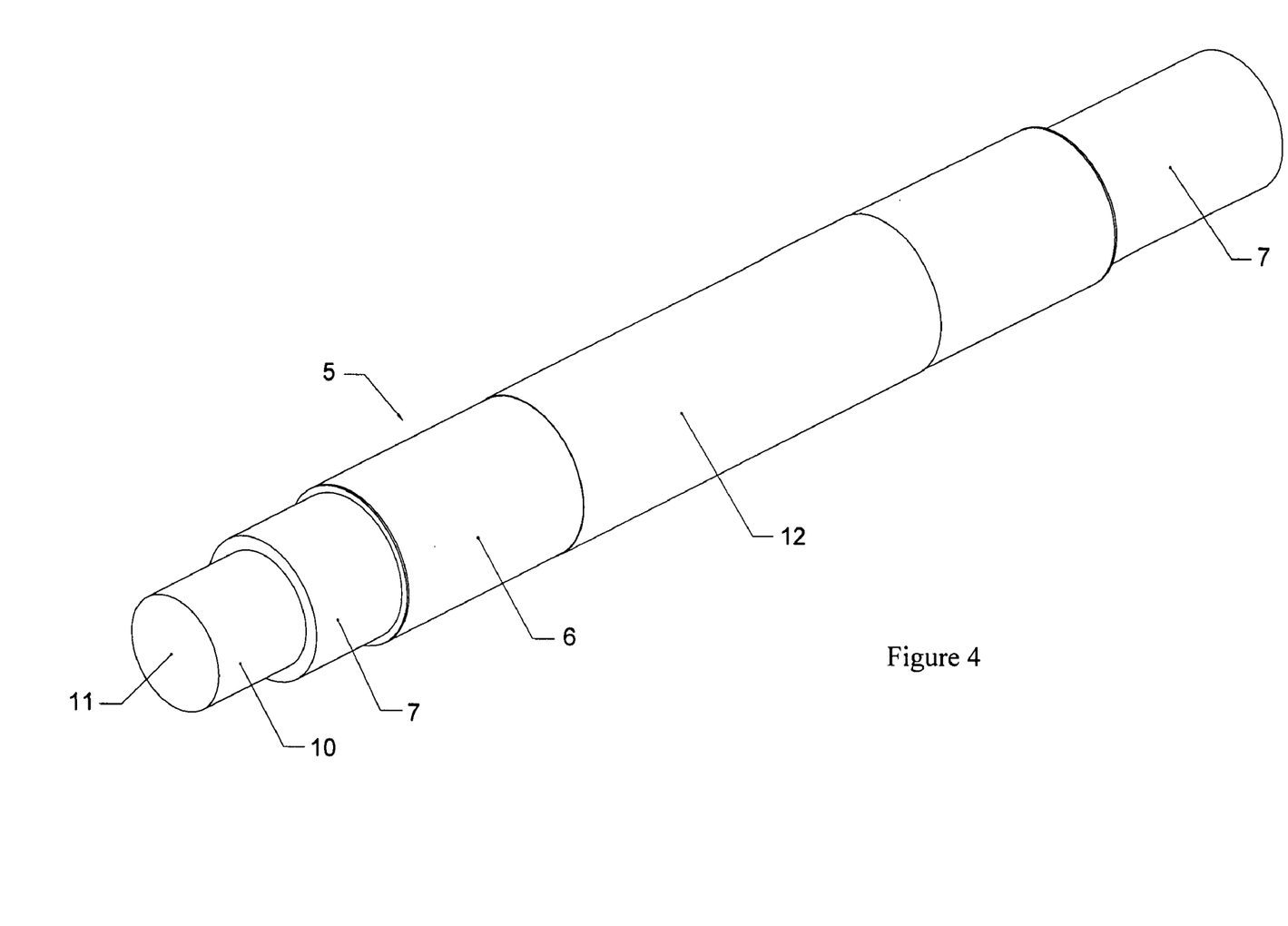
FIG. 4 shows an inner member of the tubular machine of FIG. 1.

A radially inner member 5 is positioned coaxially inside the outer member 2 such that there is a small radial air gap between the substantially cylindrical outer surface of the inner member and the substantially cylindrical inner surface of the outer member. Superconducting coils 4 are located in a series of axially spaced slots at the outer surface of the inner member 5 that are defined between support sections 13. The superconducting coils 4 are located inside a vacuum insulated cryostat 6. The superconducting coils 4 are simple circular solenoid coils, wound from commercially available HTS tape. For example, each coil 4 could consist of about 4000 turns of BSCCO-2223 tape carrying 200 A, wherein the tape is approximately rectangular in cross-section with typical dimensions being 4 mm wide and 0.2 mm thick. The superconducting coils 4 are arranged in pairs with opposite polarity current in the two coils of each pair. The polarity of current flow is represented in FIG. 4 by the arrows.

Bearing locations 7 are provided at each end of the inner member 5. The bearings (not shown) may be sliding bearings, rolling bearings, active magnetic bearings or passive superconducting magnetic bearings, for example.

When the tubular machine is in use, the outer member 2 is held stationary and the inner member 5 undergoes reciprocal movement within the outer member. The maximum stroke length for which this tubular machine is designed is equal to the difference in length between the axial length of the inner member 5 over which the superconducting coils 4 are disposed and the axial length of the outer member 2 over which the armature coils 1 are disposed. The armature coils 1 are disposed over a greater length than the superconducting coils 4 as they are much cheaper to form than the superconducting coils. The superconducting coils 4 remain concentric with the axial length of the outer member 2 containing the armature coils 1 as the inner member 5 undergoes reciprocating movement relative to the outer member.

Figure 6:
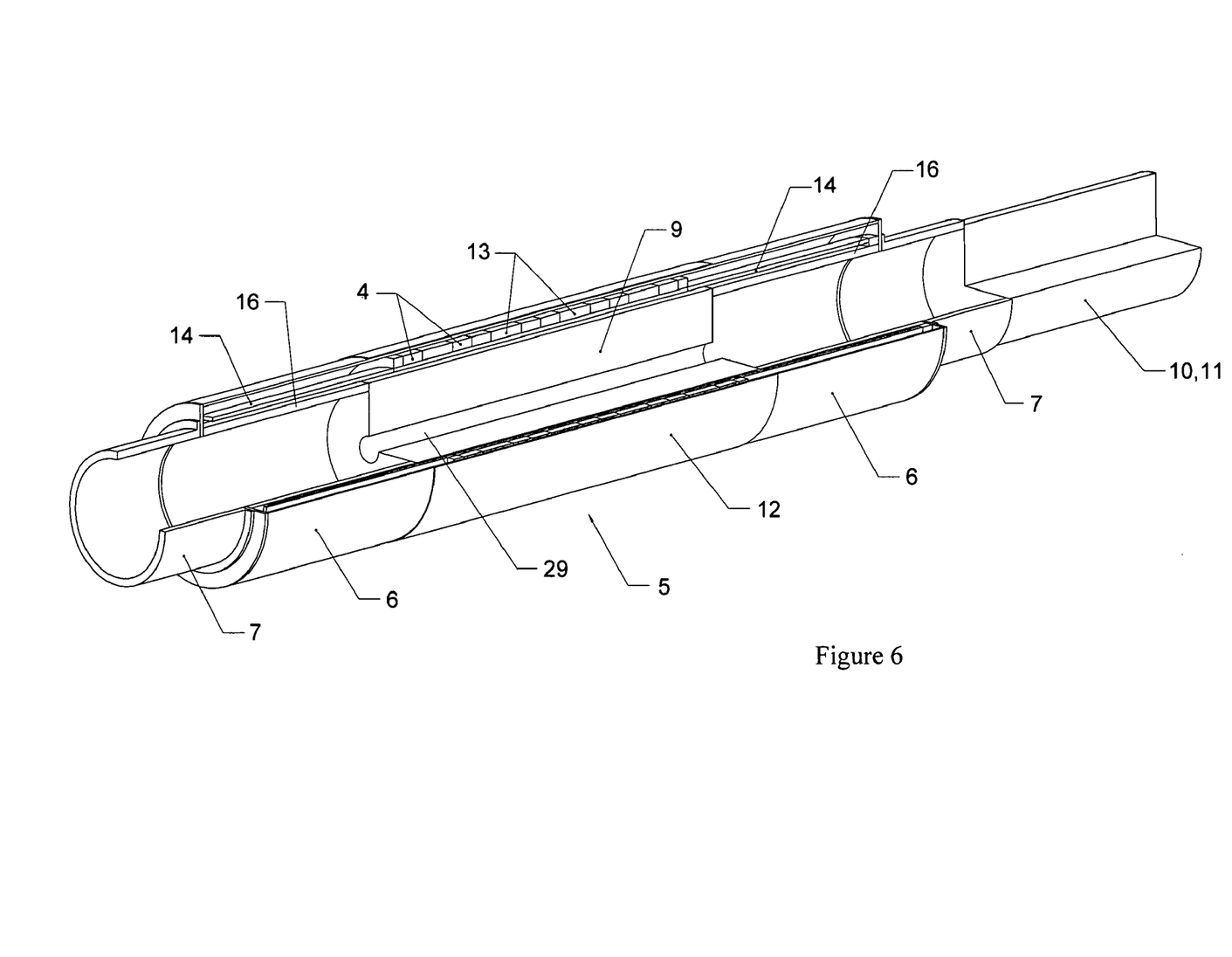
FIG. 6 is a cutaway view of the inner member of FIG. 4.

A cryostat 6 surrounds the superconducting coils 4 and insulates them from a radially inner region (or core) 9 of the inner member 5. This region 9 is substantially solid and formed from mild steel. The cryostat 6 is supplied with a suitable coolant by a cryocooler 10, which is situated at the end of the inner member 5 and reciprocates with it. An excitation system 11 for the superconducting coils 4 is situated at the same end of the inner member 4 and also reciprocates with it. The excitation system 11 consists of conventional power electronics, control and protection to supply DC current to the superconducting coils 4. The excitation system 11 and cryocooler 10 are both supplied with power and from a remote source by a flexible cable (not shown).

The axial length of the outer surface of the inner member 5 containing the superconducting coils 4 is formed by a sleeve 12 of high conductivity metal, for example copper or aluminum. This sleeve 12 forms a low resistance path for eddy currents in order to shield the superconducting coils 4 from AC magnetic flux that is caused by harmonics in the armature winding and by load changes, which would otherwise cause heating of the superconducting coils 4.

Figure 5:
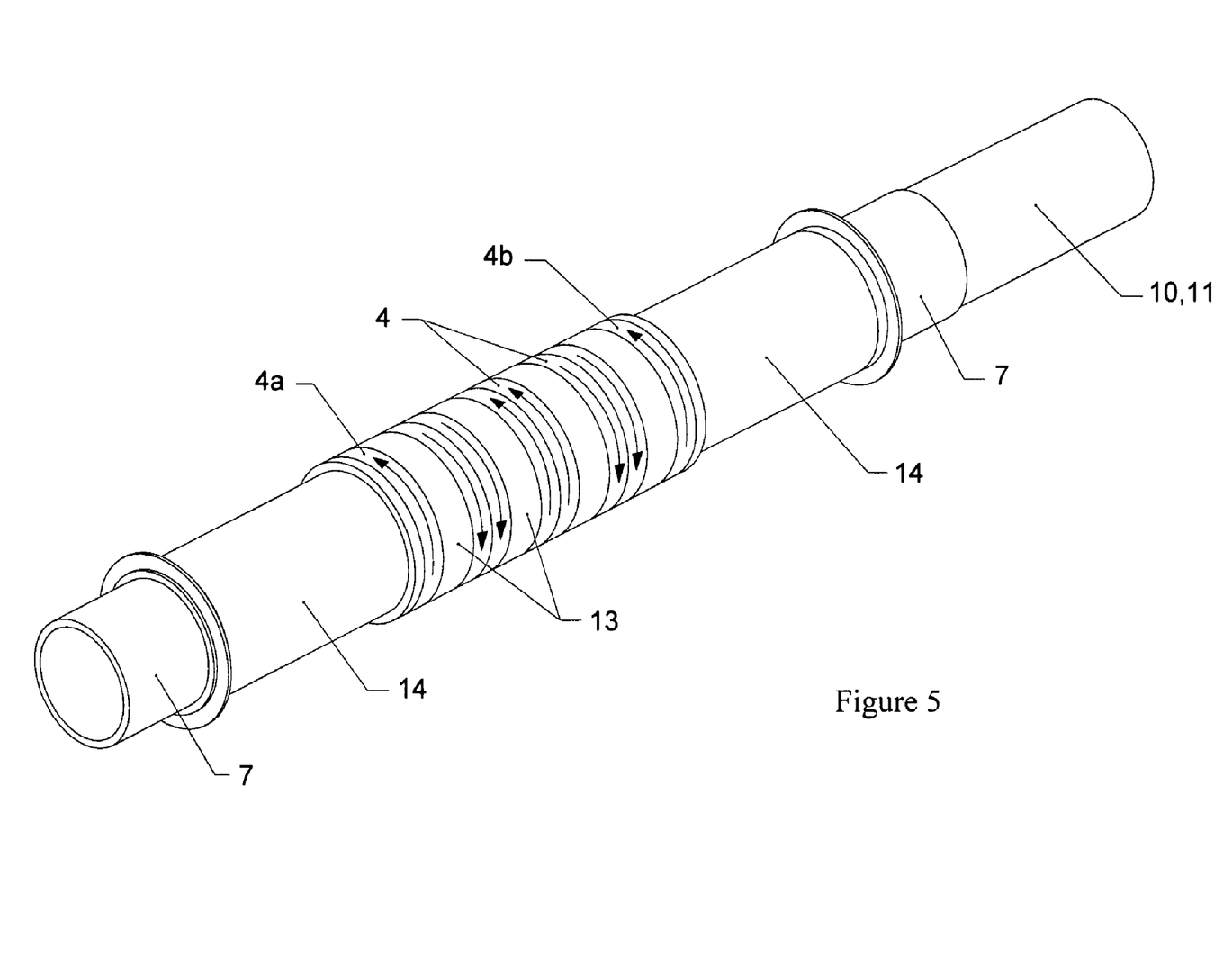
FIG. 5 shows the inner member of FIG. 4 with the cryostat wall and shield removed.

FIG. 5 shows the inner member 5 with the sleeve 12 and cryostat 6 removed. The support sections 13 of the inner member 5 that form the slots for containing the superconducting coils 4 are clearly shown. The support sections 13 are maintained at approximately the same operating temperature as the superconducting coils 4 and may be made from any suitable non-magnetic material that has suitable mechanical and thermal properties at the operating temperature such as stainless steel. The space between the superconducting coils 4, the support sections 13 and the inner wall of the cryostat 6 contains a high-grade vacuum (less than $10^{-3}$ mBar) together with multi-layer insulation to maintain a thermal barrier. The radially inner wall of the cooled section defined by the cryostat 6 is formed by a force tube 14. The force tube 14 connects the support sections 13, the superconducting coils 4 and the cryostat 6 to the shaft of the inner member 5 at one of its ends. As shown in FIG. 6, the force tube 14 is radially spaced apart from the shaft of the inner member 5 by a high grade vacuum and multi-layer insulation that provides a thermal barrier. The force tube 14 provides mechanical support to the cooled components and a temperature gradient between cooled components and the shaft of the inner member 5, which is relatively warm. The force tube 14 is designed to keep the amount of heat that is conducted to the cold parts to an acceptable level. The force tube 14 may be formed from any relatively strong material with relatively low thermal conductivity, such as stainless steel or Inconel® (high strength nickel-chromium-iron alloys). Alternatively, many composite materials could provide enough mechanical support and suitably low heat conduction.

The radially inner region 9 of the inner member 5 extends along the axial length over which the superconducting coils 4 are contained and is substantially formed from solid iron. In this embodiment, the center of the radially inner region 9 is provided with an aperture 29 to provide a possible route for the coolant and power leads (not shown) from the cryocooler 10 and the excitation system 11. However it is to be understood that this aperture is not a necessary part of the present invention and in some circumstances it may be preferable to have an entirely solid core to the inner member 5 and to take the coolant and current leads to the superconducting coil support structure at the end of the radially inner region 9 and use connecting leads of HTS material between the individual coils. The radially inner region 9 provides a low reluctance flux path for the magnetic field created by the superconducting coils 4. The remaining axial length of the inner member 5 outside of the superconducting coils 4 is formed as a hollow steel tube 16 in order to minimize the weight and cost of the inner member.

Figure 7:
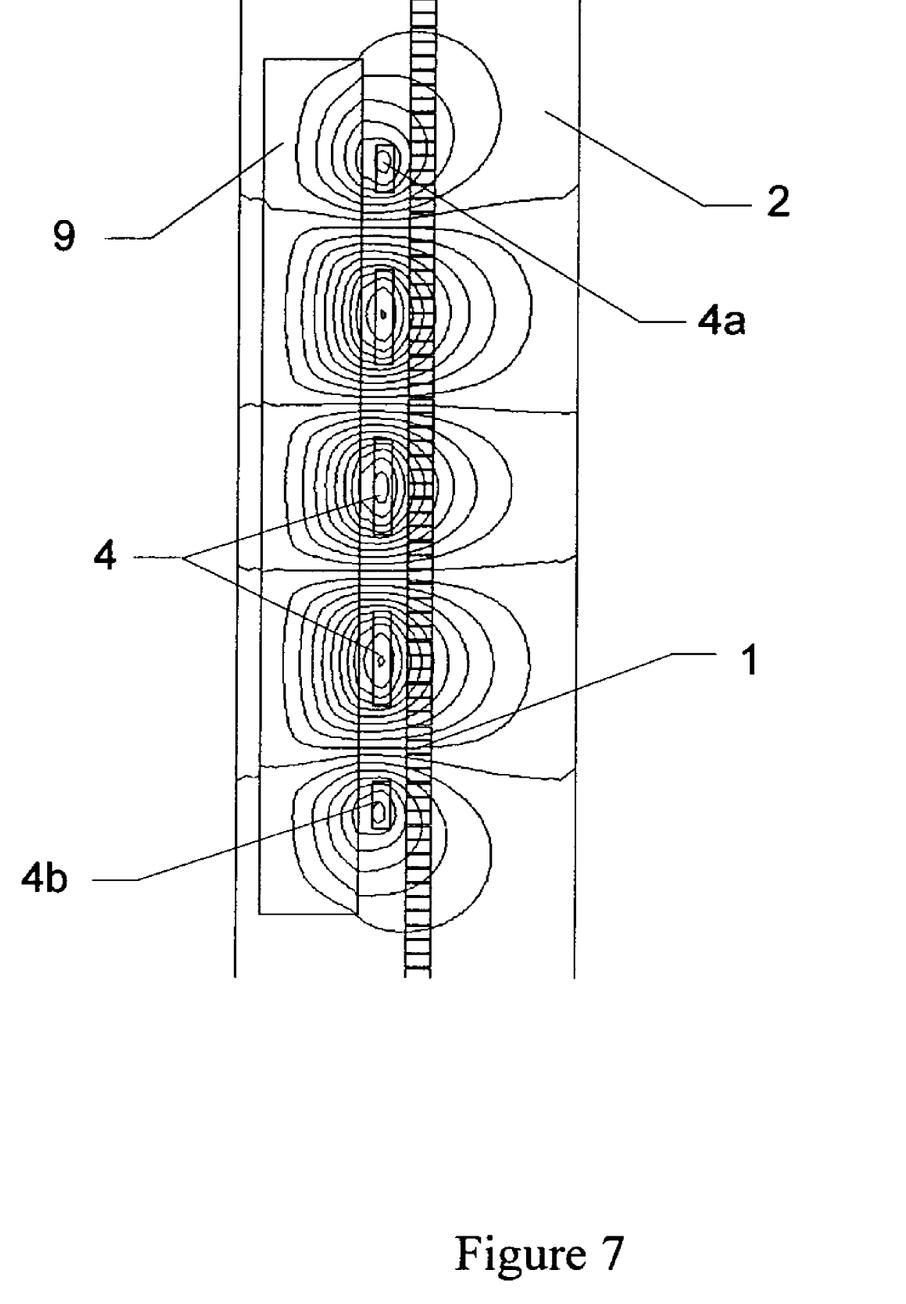
FIG. 7 shows a representation of the magnetic field around the superconducting coils when the tubular machine of FIG. 1 is in use.

The production of magnetic poles in the machine can be best understood with reference to FIG. 7. When the tubular machine is operating, each superconducting coil 4 has an electric current flowing around it. This means that there is a magnetic field surrounding each coil. The current in the superconducting coils that are axially adjacent to one another but separated by a support section 13 is made to flow in opposite directions so that the magnetic flux of the magnetic field surrounding each coil will be in the opposite direction to the flux of the magnetic field surrounding the axially adjacent coil or coils. These opposed magnetic fields force the magnetic flux in the radial direction in the space between each pair of superconducting coils 4 (that is in the region occupied by the support sections 13) and create alternating north and south poles along the length of the superconducting winding. Although the three axially inner superconducting coils 4 are shown as being formed from two axially adjacent and touching coils, this is only because these particular coils have a greater number of turns than the two end coils for the reasons given above. As the current in each coil is of the same polarity, as represented by the arrows in FIG. 5, the two touching superconducting coils should be thought of as a single coil. In other words, the superconducting winding formed by the axially spaced superconducting coils 4 has substantially the same effect as a row of permanent magnets. However, the field density that can be produced by the superconducting coils 4 is far greater than that which is produced by permanent magnets. In order to maintain a uniform field pattern along the length of the superconducting winding, the end coils 4a and 4b have a lower number of turns of BSCCO-2223 tape than the central coils but have the same current supplied to them. Each pair of superconducting coils 4 makes one pole of the tubular machine and the total number of poles is dependent on the rating of the machine. In the example shown in FIGS. 1 to 7 there are four poles.

As described briefly above, the inner member 5 reciprocates relative to the outer member 2 and is supported at each end by the bearings (not shown). Apart from the cooling and excitation of the superconducting coils 4, the tubular machine of the present invention therefore operates in a manner that is substantially identical to conventional permanent magnet tubular machines.

This embodiment of the invention can be operated as either a motor or a generator in the same manner as conventional tubular machines. A preferred application of this embodiment of the invention is as a generator for producing electricity from wave power in off-shore locations. The tubular machine would be connected to a power electronic converter (not shown) and in the machine's simplest mode of operation this would convert the variable frequency electricity generated by the tubular machine into the fixed frequency needed for the electricity grid.

Figure 8:
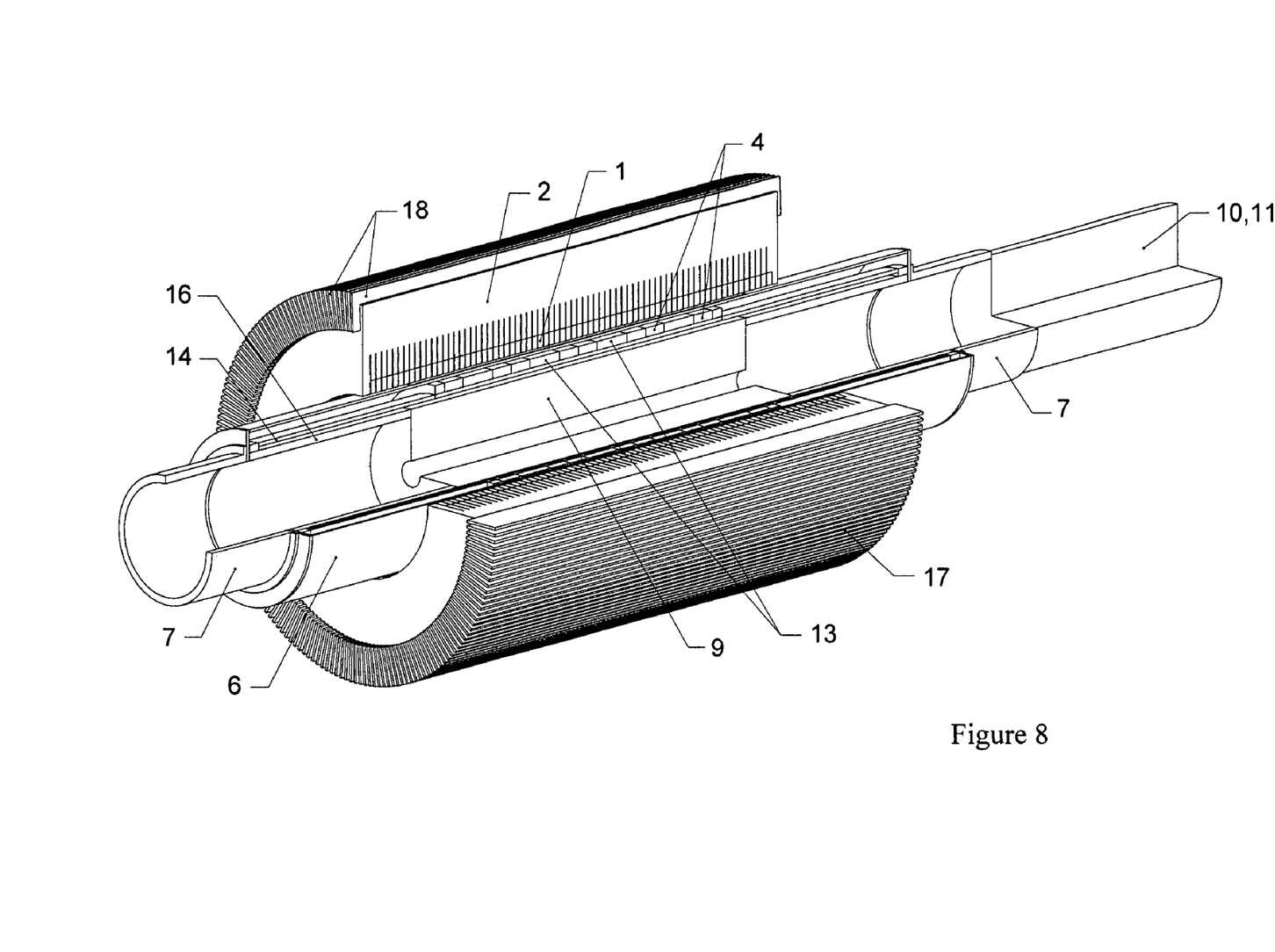
FIG. 8 is a cutaway view of a second embodiment of a tubular machine according to the present invention.

FIG. 8 shows a second embodiment of the present invention that is substantially the same as the first embodiment described above, except that the outer member 2 of the tubular machine additionally incorporates an electromagnetic shield 17. In this particular example the electromagnetic shield 17 consists of approximately 180 radially extending planar steel fins or plates 18 that are fixed parallel to the axis of the tubular machine around the outside of the outer member 2 at regular circumferential intervals. The steel plates are typically about 10 mm thick but other thicknesses such as 5 mm, 20 mm, or even 50 mm may be used depending on the circumstances. The electromagnetic shield 17 prevents stray flux from the superconducting coils 4 escaping from the tubular machine during its operation. This is important because the superconducting coils 4 will be moving relative to its surroundings and this might be a problem if any electrically conducting structures are relatively nearby. The electromagnetic shield 17 is formed in this manner so that the plates 18 are parallel to, and therefore provide a low reluctance flux path in, the principal directions of the stray flux, which will be in the axial and radial directions of the tubular machine. The electromagnetic shield 17 is not circumferentially continuous as that would facilitate the flow of circumferential eddy currents and thereby introduce undesirable eddy current losses. Although not shown, the plates 18 may protrude from the outer surface to act as cooling fins.

Figure 9:
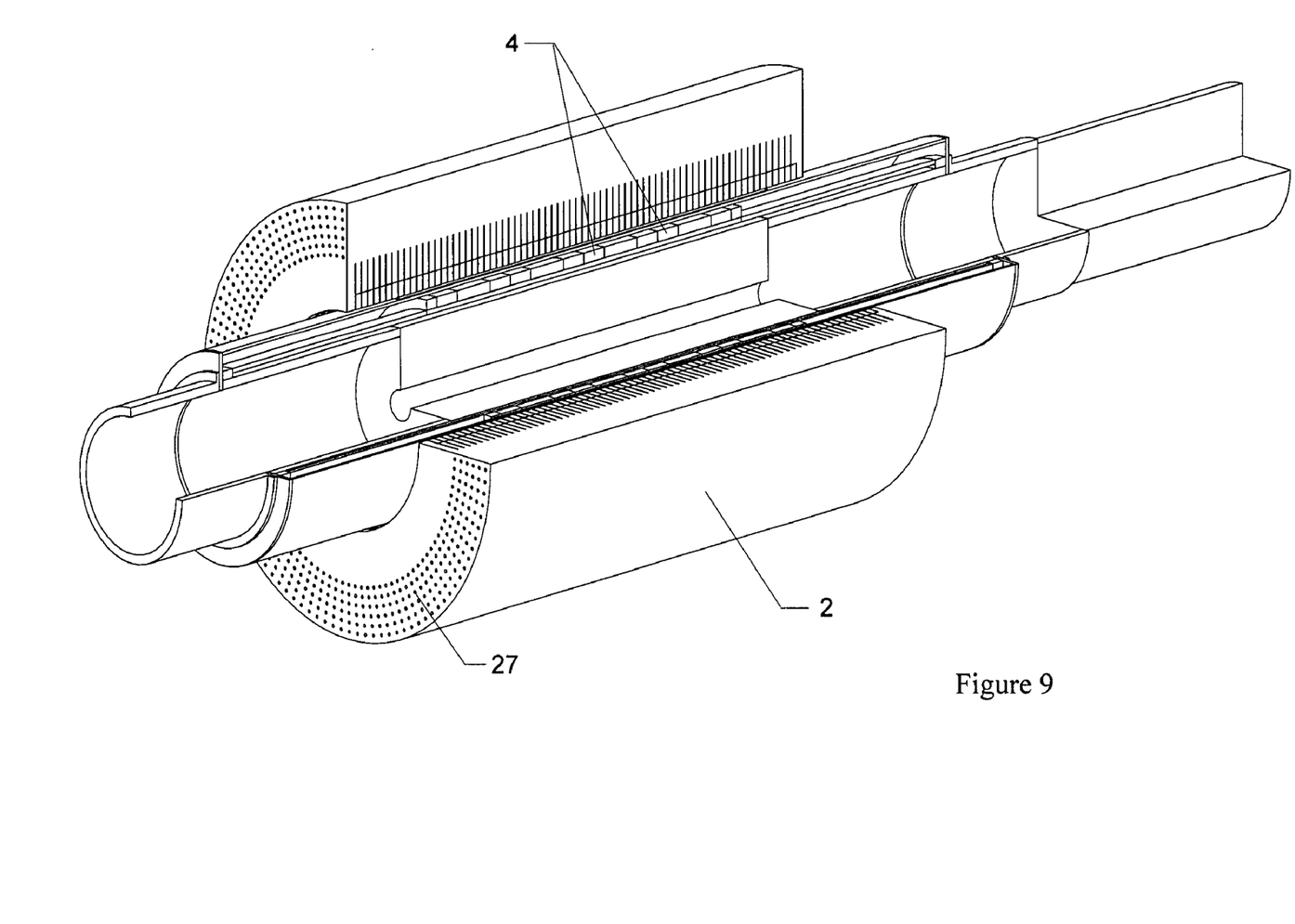
FIG. 9 shows a cutaway view of a third preferred embodiment of a tubular machine according to the present invention.

FIG. 9 shows a third embodiment of the present invention that is also substantially the same as the first embodiment described above, except that the outer member 2 of the tubular machine additionally incorporates an alternative electromagnetic shield 27 to that incorporated in the second embodiment. In this example the electromagnetic shield 27 consists of a plurality of axial steel rods that are formed in the outer member of the tubular machine at substantially regular radial and circumferential spacings. The steel rods are each identical and are of substantially circular cross-section with a diameter of approximately 10 mm. However it is to be understood that these dimensions are given as a guide only and it is equally possible to use rods of other cross section and diameter depending upon the size and design of the machine they are utilized in. The electromagnetic shield 27 operates in the same manner as the shield described in the second embodiment of the invention in that it prevents stray flux from the superconducting coils 4 escaping from the tubular machine during its operation. The electromagnetic shield 27 is formed in this manner so that the rods are axial, and therefore provide a low reluctance flux path for stray flux in that direction. The electromagnetic shield 27 is not circumferentially continuous as that would facilitate the flow of circumferential eddy currents and thereby introduce undesirable eddy current losses.

Figure 10:
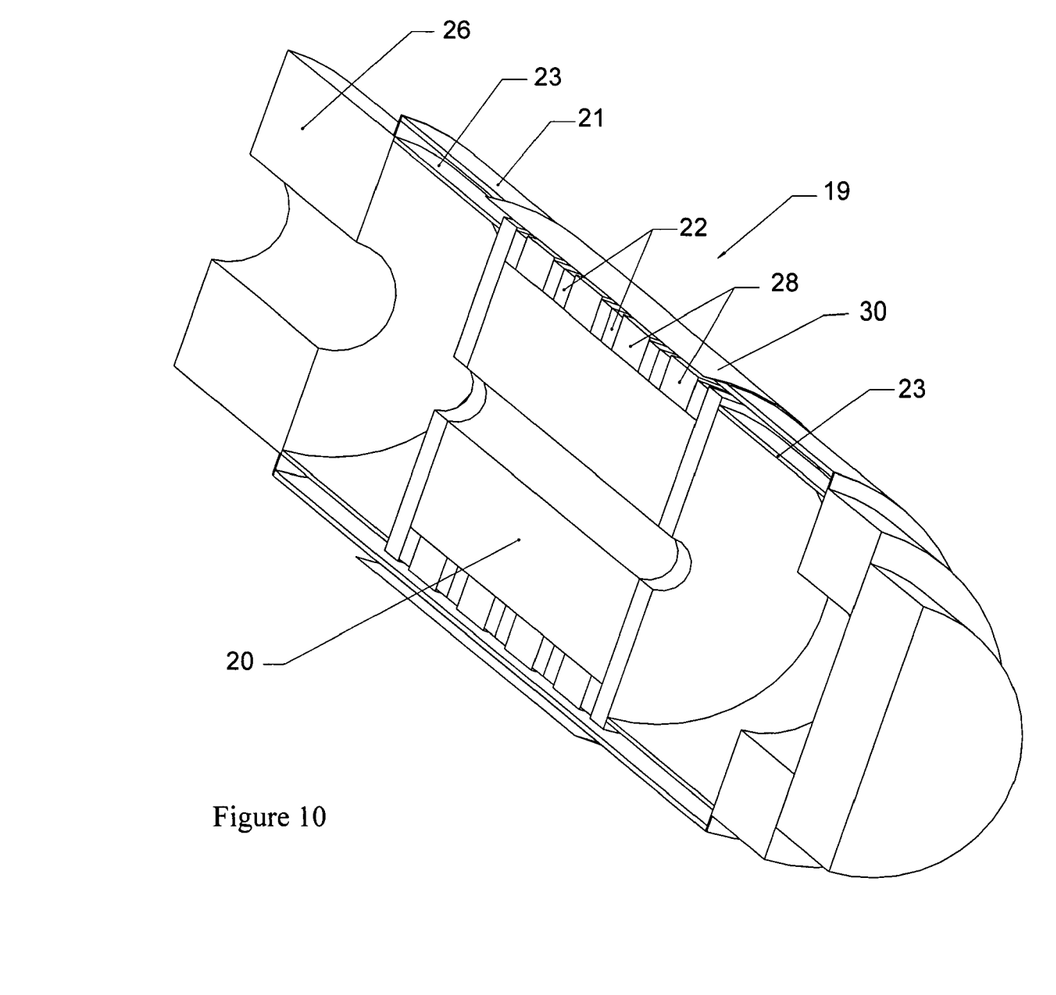
FIG. 10 is a cross section view through the inner member of a fourth preferred embodiment of a tubular machine according to the present invention.
Figure 11:
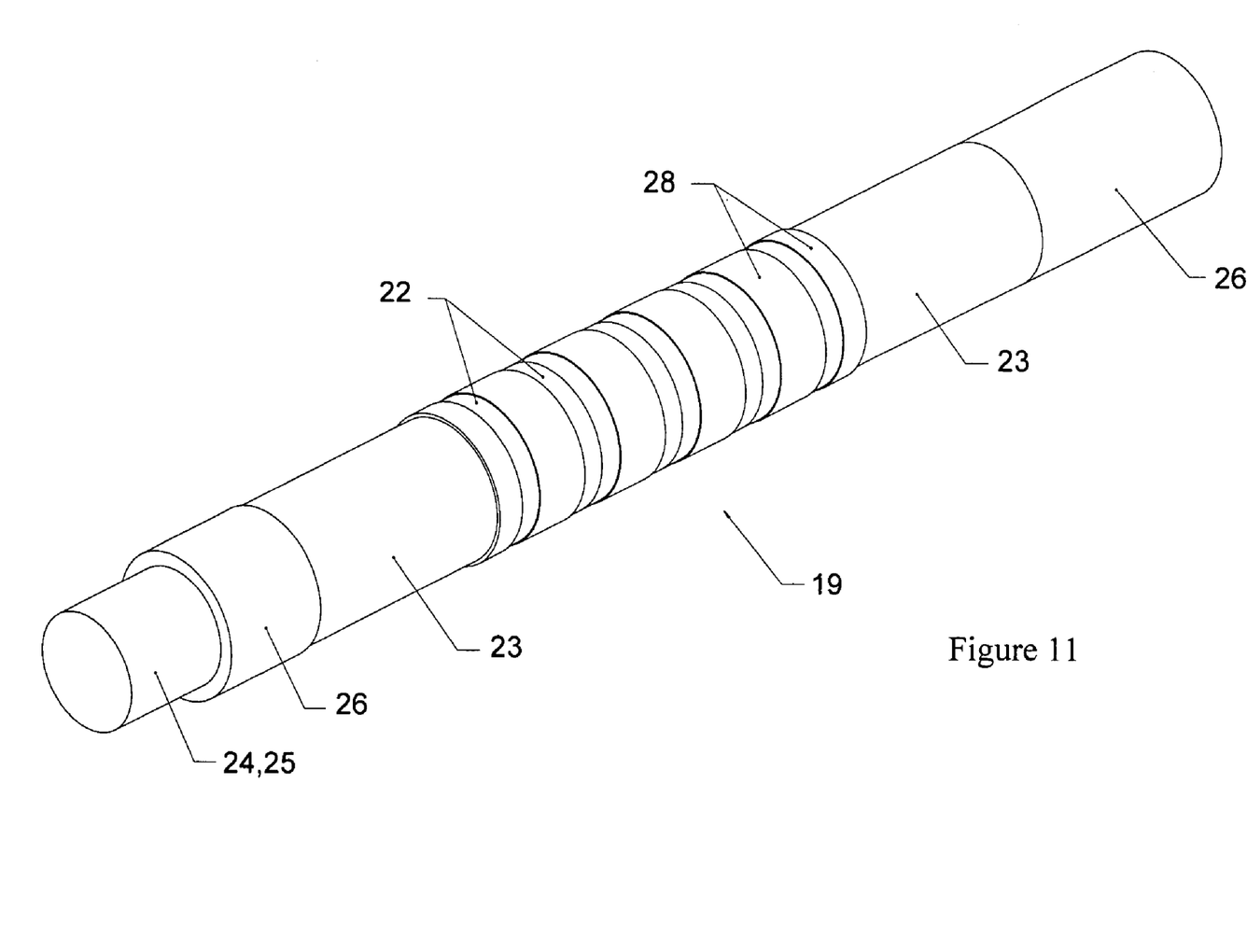
FIG. 11 shows the inner member of FIG. 10 with the cryostat wall and shield removed.

An inner member 19 of a fourth embodiment of the present invention is shown in FIGS. 10 and 11. The outer member of this embodiment is identical to that of the first embodiment and therefore is not shown. The inner member 19 is similar to that of the first embodiment except that the radially inner region (or core) 20 of the inner member 19 is cooled by a cryostat 21 to the same operating temperature as the superconducting coils 22. The inner member 19 further consists of two end sections 26 which support the bearings (not shown) and are joined to the rest of the inner member by steel force tubes 23. One of the end sections is fixed to a cryocooler 24 and an excitation cooler 25, which operate in the same manner as in the first embodiment of the present invention. The portion of the inner member 19 that is radially inside the force tubes 23 is hollow in order to minimize its weight. The inner member 19 is shown with the cryostat 21 removed in FIG. 10. The radially inner region 20 is maintained at the same temperature as the superconducting coils 22 and is preferably formed of iron containing 9% nickel. This material has suitable magnetic, thermal and mechanical properties at HTS operating temperatures. Magnetic materials with a higher proportion of nickel (for example 36% or 70%) may also be used, but as the nickel content is increased the cost of the material increases and the saturation flux density of the material decreases, which is undesirable.

The outer surface of the axial length of the inner member 19 containing the superconducting coils 22 is formed by a sleeve 25 of high conductivity metal, for example copper or aluminum. This sleeve 25 forms a low resistance path for eddy currents in order to shield the superconducting coils 22 from AC magnetic flux that is caused by harmonics in the armature winding and load changes.

The superconducting coils 22 are formed in the same manner as in the first embodiment of the invention but are wound directly around the outside of the radially inner region 20 of the inner member 19. They are separated from each other in the axial direction by support sections 28 in the same manner as the first embodiment of the present invention. However, in this embodiment the support sections sections 28 are composed of the same magnetic material (9% nickel-iron) as the radially inner region 20. In this embodiment, force tubes 23 separate the radially inner region 20 from the end sections 26 which are formed in the same manner as the previously described embodiments. The cryostat 21 is fed with coolant from the cryocooler 24 in the same manner as the inner member of the first embodiment. The cryostat wall encloses the force tubes 23, the superconducting coils 22, the support sections sections 28 and the radially inner region 20. They are all separated from the cryostat wall by a high-grade vacuum and multi-layer insulation to maintain a thermal barrier in order to be maintained at a suitable cryogenic operating temperature when the tubular machine is in use. Otherwise, this embodiment of the present invention operates in an identical manner to the first embodiment.

We claim:

1. A tubular electrical machine comprising: a radially outer member having a substantially cylindrical inner surface; a radially inner member that is coaxially disposed within the outer member such that the inner member is reciprocally movable relative to the outer member in an axial direction; a plurality of axially spaced armature coils that are electrically insulated from one another and are formed as part of one of the outer member and the inner member; and a plurality of axially spaced superconducting coils that are formed as part of the other one of the outer member and the inner member, each super conducting coil, during operation of the tubular electrical machine, being maintained in a superconducting state, and an electrical current being supplied to each superconducting coil in such a manner that a current flowing around each superconducting coil is in an opposite direction to a current flowing around the axially adjacent superconducting coil or coils.

2. The tubular electrical machine according to claim 1, further comprising a cryocooling system to maintain the superconducting coils in the superconducting state.

3. The tubular electrical machine according to claim 2, wherein the armature coils are formed as part of the outer member, and wherein the superconducting coils are formed as part of the inner member.

4. The tubular electrical machine according to claim 3, wherein at least an axial length of the inner member radially inside of the superconducting coils is substantially solid and formed of a magnetic material.

5. The tubular electrical machine according to claim 3, wherein the cryocooling system maintains the inner member at a same operating temperature as the superconducting coils.

6. The tubular electrical machine according to claim 5, wherein the inner member is formed of 9% Ni, iron.

7. The tubular electrical machine according to claim 3, wherein the inner member is thermally insulated from the cryocooling system by a heat shield.

8. The tubular electrical machine according to claim 7, wherein the inner member is substantially formed of mild steel.

9. The tubular electrical machine according to claim 3, wherein the outer member is substantially formed of concrete.

10. The tubular electrical machine according to claim 3, wherein the outer member includes an electromagnetic shield.

11. The tubular electrical machine according to claim 10, wherein the electromagnetic shield comprises a plurality of metal plates circumferentially spaced around an outer surface of the outer member.

12. The tubular electrical machine according to claim 11, wherein the metal plates are fixed in the outer member such that the metal plates are arranged parallel to an axis of the outer member and circumferentially spaced around an outer surface of the outer member.

13. The tubular electrical machine according to claim 11, wherein the metal plates are formed of steel.

14. The tubular electrical machine according to claim 11, wherein the metal plates are about 10 mm thick.

15. The tubular electrical machine according to claim 11, wherein the metal plates protrude out from the outer surface of the outer member and act as heat exchangers.

16. The tubular electrical machine according to claim 10, wherein the electromagnetic shield comprises a plurality of regularly-spaced axial metal rods formed within the outer member.

17. The tubular electrical machine according to claim 16, wherein the metal rods are formed of steel.

18. The tubular electrical machine according to claim 16, wherein each rod is substantially circular in cross-section and has a diameter of approximately 10 mm.

19. The tubular electrical machine according to claim 1, wherein the outer member includes a substantially cylindrical outer surface.

20. The tubular electrical machine according to claim 1, wherein the armature coils are substantially formed from at least one turn of wound litz wire.

21. The tubular electrical machine according to claim 1, wherein the armature coils are substantially formed from fully transposed strands of copper wire.

22. The tubular electrical machine according to claim 1, wherein the armature coils are substantially formed from fully transposed strands of aluminum wire.

23. The tubular electrical machine according to claim 1, wherein the armature coils are separated from one another in the axial direction by insulating spacers.

24. The tubular electrical machine according to claim 23, wherein the insulating spacers are substantially formed of an epoxy-glass composite.

25. The tubular electrical machine according to claim 23, wherein each insulating spacer contains a plurality of radially extending, circumferentially spaced thermally conductive rods.

26. The tubular electrical machine according to claim 25, wherein the armature coils are formed as part of the outer member, and wherein thermally conductive rods extend out of a radially outer surface of the insulating spacers and into a body of the outer member.

27. The tubular electrical machine according to claim 25, wherein each rod is formed of steel and has a maximum cross-sectional dimension of less than 5 mm.

28. The tubular electrical machine according to claim 1, wherein the armature coils are connected to form a three-phase alternating current winding.

29. The tubular electrical machine according to claim 1, wherein the superconducting coils are formed from at least one turn of high temperature superconducting material.

30. The tubular electrical machine according to claim 1, wherein a surface of the other one of the inner member and the outer member that is adjacent to the superconducting coils is formed by a sleeve of high conductivity metal over at least an axial length of the other one of the inner member and outer member that contains the superconducting coils.

31. The tubular electrical machine according to claim 1, wherein the armature coils and the superconducting coils are at least about 200 mm in diameter.

32. The tubular electrical machine according to claim 1, wherein an axial length of the inner member is about twice an axial length of the outer member.

33. The tubular electrical machine according to claim 1, wherein, during operation of the tubular electrical machine, the outer member is held stationary.

* * * * *